(12) United States Patent
Patel et al.

(10) Patent No.: US 11,874,256 B2
(45) Date of Patent: Jan. 16, 2024

(54) METHODS FOR THE EVALUATION OF SYSTEM INERTNESS

(71) Applicant: Waters Technologies Corporation, Milford, MA (US)

(72) Inventors: Amit Patel, Shrewsbury, MA (US); Moon Chul Jung, Waltham, MA (US); Thomas H. Walter, Ashland, MA (US); Matthew A. Lauber, North Smithfield, RI (US); Kevin Wyndham, Upton, MA (US); Mathew DeLano, Needham, MA (US); Jennifer Simeone, Shrewsbury, MA (US)

(73) Assignee: Waters Technologies Corporation, Milford, MA (US)

( * ) Notice: Subject to any disclaimer, the term of this patent is extended or adjusted under 35 U.S.C. 154(b) by 78 days.

(21) Appl. No.: 17/471,449

(22) Filed: Sep. 10, 2021

(65) Prior Publication Data

US 2022/0082532 A1    Mar. 17, 2022

Related U.S. Application Data

(60) Provisional application No. 63/079,160, filed on Sep. 16, 2020, provisional application No. 63/079,156, filed on Sep. 16, 2020.

(51) Int. Cl.
*G01N 30/16* (2006.01)
*G01N 30/72* (2006.01)
(Continued)

(52) U.S. Cl.
CPC ............. *G01N 30/16* (2013.01); *G01N 30/72* (2013.01); *G01N 30/74* (2013.01);
(Continued)

(58) Field of Classification Search
CPC ........ G01N 30/16; G01N 30/72; G01N 30/74; G01N 30/8637; G01N 30/06; G01N 2030/027; G01N 30/88; G01N 2030/889
See application file for complete search history.

(56) References Cited

U.S. PATENT DOCUMENTS 6,416,642 B1 * 7/2002 Alajoki ............... B01L 3/50273
 435/287.7
7,015,046 B2 * 3/2006 Wohlstadter .......... B01L 3/5027
 436/805
(Continued)

FOREIGN PATENT DOCUMENTS

EP     1630190 P    3/2006

OTHER PUBLICATIONS

International Search Report and Written Opinion issued in International Application No. PCT/IB2021/058257 dated Dec. 7, 2021.
(Continued)

*Primary Examiner* — Francis C Gray
(74) *Attorney, Agent, or Firm* — WOMBLE BOND DICKINSON (US) LLP; Deborah M. Vernon

(57) ABSTRACT

The present disclosure is directed to methods for evaluating system inertness, such as the inertness of a LC or other fluidic system. Some methods are directed to tests wherein the column has been removed prior to injecting a sample including a positive (e.g., metal reacting moiety) control into the system. Some methods can include: (1) repeatedly injecting the sample into a system, the system comprising: fluidic paths wherein interior surfaces of the fluidic paths define wetted surfaces, and wherein at least a portion of the wetted surfaces of the fluidic flow path are coated with an inert coating, wherein the inert coating is inert to at least one analyte in the sample; (2) detecting a value associated with the positive control; and (3) analyzing values associated
(Continued)

with the detected positive control to determine system inertness.

24 Claims, 9 Drawing Sheets

(51) Int. Cl.
*G01N 30/74* (2006.01)
*G01N 30/86* (2006.01)
*G01N 30/06* (2006.01)
*G01N 30/02* (2006.01)

(52) U.S. Cl.
CPC ......... *G01N 30/8637* (2013.01); *G01N 30/06* (2013.01); *G01N 2030/027* (2013.01)

(56) References Cited

U.S. PATENT DOCUMENTS

| | | | |
|---|---|---|---|
| 9,255,866 B2* | 2/2016 | Dirckx | G01N 35/08 |
| 10,852,310 B2* | 12/2020 | Haddad | B01L 3/502784 |
| 2006/0027098 A1 | 2/2006 | Lautamo | |
| 2006/0275852 A1* | 12/2006 | Montagu | B01L 3/50273 |
| | | | 435/7.93 |
| 2008/0273918 A1* | 11/2008 | Linder | B01L 3/502761 |
| | | | 403/31 |
| 2009/0075390 A1* | 3/2009 | Linder | A61L 2/0082 |
| | | | 422/69 |
| 2009/0181411 A1* | 7/2009 | Battrell | B01L 3/50273 |
| | | | 422/68.1 |
| 2019/0086371 A1 | 3/2019 | Lauber et al. | |
| 2020/0215457 A1 | 7/2020 | DeLano et al. | |
| 2020/0217827 A1 | 7/2020 | Liu et al. | |

OTHER PUBLICATIONS

Saito et al. "High-Purity Fused-Silica Capillary Columns for Gas Chromatography." J. Chromatogr. 243(1982): 189-206.

Soboleva et al. "Application of a system suitability test for quality assurance and performance optimisation of a gas chromatographic system for pesiticide residue analysis." J. Chromatogr. A. 1027(2004): 55-65.

Wright et al. "New method for evaluating irreversible adsorption and stationary phase bleed in gas chromatographic capillary columns." J. Chromatogr. A. 1261(2012): 142-150.

Zenkevich et al. "Inertness Criterion for Gas-Chromatographic Systems." J. Anal. Chem. 69.12(2014): 1130-1140.

* cited by examiner

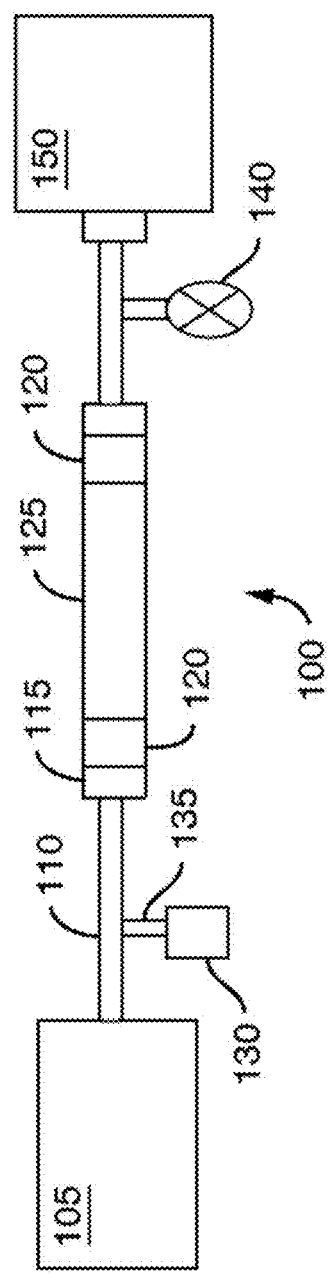

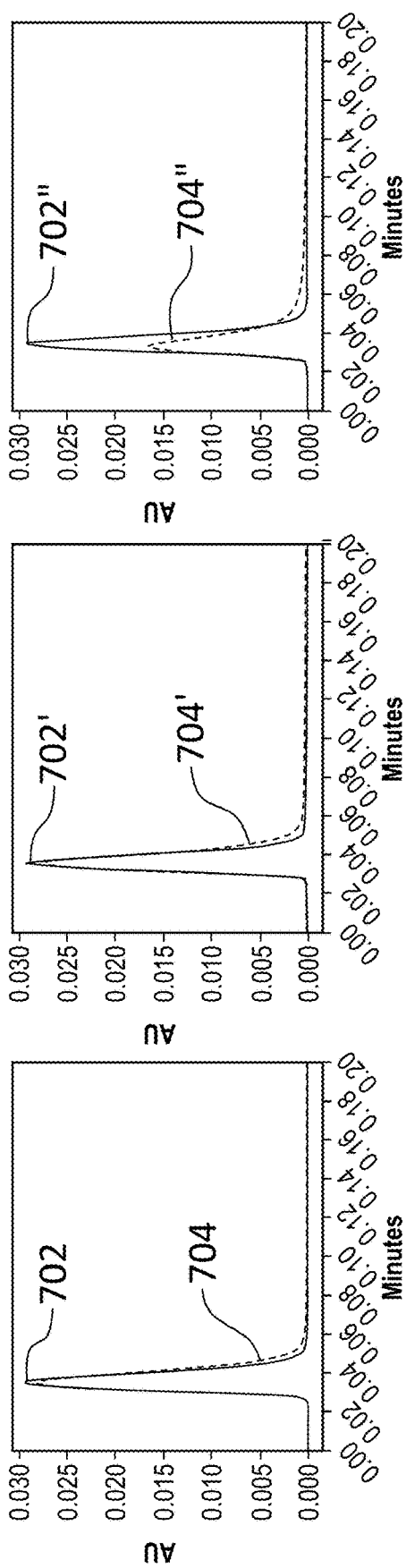
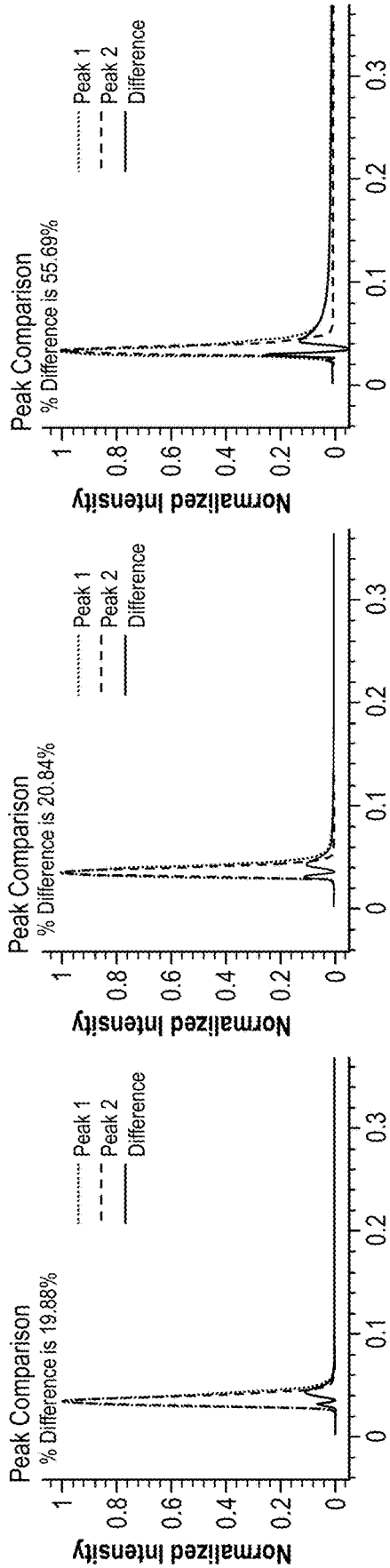
FIG. 7A  FIG. 8A  FIG. 9A
FIG. 7B  FIG. 8B  FIG. 9B

METHODS FOR THE EVALUATION OF SYSTEM INERTNESS

CROSS-REFERENCE TO RELATED APPLICATIONS

This application claims priority and benefit to U.S. Provisional Patent Application No. 63/079,156, filed on Sep. 16, 2020, and entitled "Systems for the Evaluation of System Inertness." This application also claims priority and benefit to U.S. Provisional Patent Application No. 63/079,160, filed on Sep. 16, 2020, and entitled "Evaluation of System Inertness". The content of both applications are incorporated herein by reference in their entirety.

FIELD OF THE TECHNOLOGY

The present disclosure relates to systems for the evaluation of system inertness. More specifically, this technology relates to systems for evaluating whether a system, such as an inert liquid chromatography system, is functioning properly and inert.

BACKGROUND

Liquid chromatography (LC) is an analytical separation technique, which enables the separation of a mixture of chemical species on the basis of differential interactions between the compounds of the mixture and a stationary phase—defined as primary interactions, which are the anticipated interactions between the mixture, the designed stationary phase and the modulations from specifically chosen mobile phase/environmental conditions. These interactions are dependent on a number of controlled variables, such as mobile phase composition, temperature and flow rate. Because the analytical figures of merit of a given separation are dependent on a large number of variables, which directly impact the extent and degree of the primary chemical interactions, care is taken to operate at a consistent set point—through careful preparation of mobile phases, proper thermostatic control of equipment and use of reproducibly manufactured chromatographic columns.

SUMMARY

In general, the technology is directed to methods for evaluating a system (such as a chromatographic system or fluidic system) for determining the suitability for a particular application. In particular, the present technology can utilize one or more systems (such as a sample injector, frits, and various other components) for evaluating the inertness of LC systems. For example, when evaluating system inertness, the system can use only a positive control (surface interacting probe). And a set of consecutive injections can be performed with a chromatographic column or without a chromatographic column. Besides the positive control, a negative control (non-interacting probe) can be used with a single injection and along with other detectors such as fluorescence, ultraviolet/visible (UV/Vis) absorbance, or MS, such as optical detection by positive and negative control molecules having unique spectral properties. The positive control and negative control can also be used with a single injection and without a chromatographic column, such as fluorescent detection with molecules having distinct excitation and emission spectral bands. The information gleamed from the systems of the present technology can be used by an analyst to determine if a system is suitable for a particular separation, e.g., to determine if the system is inert to metal interactions when separating a metal-sensitive analyte.

In one aspect, the present technology is directed to a method for evaluating system inertness. The method comprises repeatedly injecting a sample into a system (e.g., two or more times, three or more times, 5 or more times, six or more times, 10 or more times, etc.), wherein the sample comprises a positive control, the system comprises fluidic paths wherein interior surfaces of the fluidic paths define wetted surfaces, and wherein at least apportion of the wetted surfaces of the fluidic paths are coated with an inert coating, and wherein the inert coating is inert to at least one analyte in the sample. The method further includes detecting a value associated with the positive control; and analyzing values associated with the detected positive control to determine system inertness.

The above aspect can include one or more of the following features. In some embodiments, the positive control comprises a metal sensitive or metal chelating molecule. In certain embodiments, the sample consists of or essentially consists of the positive control, and the system is without a chromatographic column. In certain embodiments, the sample further comprises a negative control. In embodiments including a negative control, the method can further include detecting a value associated with the negative control and determining system inertness by comparing the amount of detected positive control to negative control. In some embodiments, the positive control and negative control are structurally similar. Some embodiments of the method can also include: detecting the negative control with the detector, wherein a value associated with the detected positive control is a peak area value, wherein analyzing the value associated with the detected positive control to determine system inertness comprises comparing the peak area value of the detected positive control with a peak area value of the detected negative control to determine a ratio of the peak area values, and then comparing the determined ratio of the peak area values of the detected positive control and the detective negative control to a reference value.

In another aspect, the present technology is directed to a method for evaluating system inertness. The method of this aspect of the technology comprises: injecting a sample into a system, wherein the sample comprises a positive control; detecting the positive control with the detector; and analyzing a value associated with the detected positive control to determine system inertness. The system of the method includes a sample injector having a sample injection needle for injecting the sample; a sample reservoir container in fluid communication with the sample injector; a detector downstream of the sample injector; and fluid conduits connecting the sample injector, sample reservoir container, and detector. The interior surfaces of the fluid conduits, sample injector, sample reservoir container, and detector form a fluidic flow path having wetted surfaces. At least a portion of the wetted surfaces of the fluidic flow path are coated with an inert coating, and wherein the inert coating is inert to at least one analyte in the sample.

The above aspect can include one or more of the following features. In some embodiments, the positive control comprises a metal sensitive or metal chelating molecule. In certain embodiments, the sample consists of or essentially consists of the positive control, and the system is without a chromatographic column. In certain embodiments, the sample further comprises a negative control. In embodiments including a negative control, the method can further include detecting the negative control and determining system inertness by comparing the amount of detected positive control to negative control. In some embodiments, the positive control and negative control are structurally similar. In some embodiments, the detector of the system comprises at least one of a fluorescence detector, UV/Vis absorbance detector, or mass spectrometer. Some embodiments of the method can also include: detecting the negative control with the detector, wherein a value associated with the detected positive control is a peak area value, wherein analyzing the value associated with the detected positive control to determine system inertness comprises comparing the peak area value of the detected positive control with a peak area value of the detected negative control to determine a ratio of the peak area values, and then comparing the determined ratio of the peak area values of the detected positive control and the detective negative control to a reference value. In some embodiments, determining system inertness by comparing the amount of detected positive control to negative control comprises calculating a peak shape differential between the positive control and negative control. In certain embodiments, a difference of 30% or less in peak shape differential indicates suitable inertness. Some embodiments of the methods of this aspect feature multiple injections of the sample (e.g., two or more, three or more, four or more, at least five times, five or more, six or more, ten or more, etc.). The sample can include just the positive control or in some embodiments both the positive and negative controls. In certain embodiments, the inert coating within the system includes siloxane moieties. In some embodiments the inert coating within the system is an alkylsilyl coating.

The above aspects and features of the present disclosure provide numerous advantages over the existing technology. In some embodiments, there are numerous benefits relating to systems for the evaluation of system inertness. The present disclosure characterizes systems by evaluating whether a system, such as an inert liquid chromatography system, is functioning properly and is inert. This information can prevent wasted resources of time and expense as knowledge of the suitability of the system for a particular application will eliminate or greatly reduce experiments destined to give poor quality results.

In some examples, the present disclosure includes isolating and testing a component of the system at a given time. Only a portion of the LC system may need to be tested at a given time. For example, when a component of the LC system (e.g., sample injector or other component) is replaced, the component may be evaluated. Evaluating only a portion of the system (e.g., only a component of the system) may be useful or advantageous for troubleshooting the system and whether the components of the flow path are inert.

In some examples, no chromatography column is used and repeat injections of the suitability sample are flowed through the system and to the detector. If the detector indicates that the compound of the suitability sample is increasing, it may be an indication that the system is not inert. For example, there may be exposed metal, and the sample is slowly passivating the exposed metal so that an increasing amount of suitability sample is detected after each injection.

BRIEF DESCRIPTION OF THE DRAWINGS

The technology will be more fully understood from the following detailed description taken in conjunction with the accompanying drawings, in which:

FIG. 1 is a schematic of a chromatographic system including a chromatography column and various other components, in accordance with an illustrative embodiment of the present disclosure.

FIG. 7A is a chromatogram showing the caffeine peak and the AMPcP peak on a chromatographic system equipped with PEEK (no metal).

FIG. 7B displays a peak comparison tool for comparison of AMPcP and caffeine peak shapes provided in FIG. 7A.

FIG. 8A is a chromatogram showing the caffeine peak and the AMPcP peak on a chromatographic system equipped with ethylene bridged hybrid coated chromatographic surfaces (inert material covering metal surfaces).

FIG. 8B displays a peak comparison tool for comparison of AMPcP and caffeine peak shapes provided in FIG. 8A.

FIG. 9A is a chromatogram showing the caffeine peak and the AMPcP peak on a chromatographic system equipped with purposely degraded ethylene bridge hybrid coated chromatographic surface (metal exposure due to degradation of coating expected).

FIG. 9B displays a peak comparison tool for comparison of AMPcP and caffeine peak shapes provided in FIG. 9A.

DETAILED DESCRIPTION

Figure 2A:
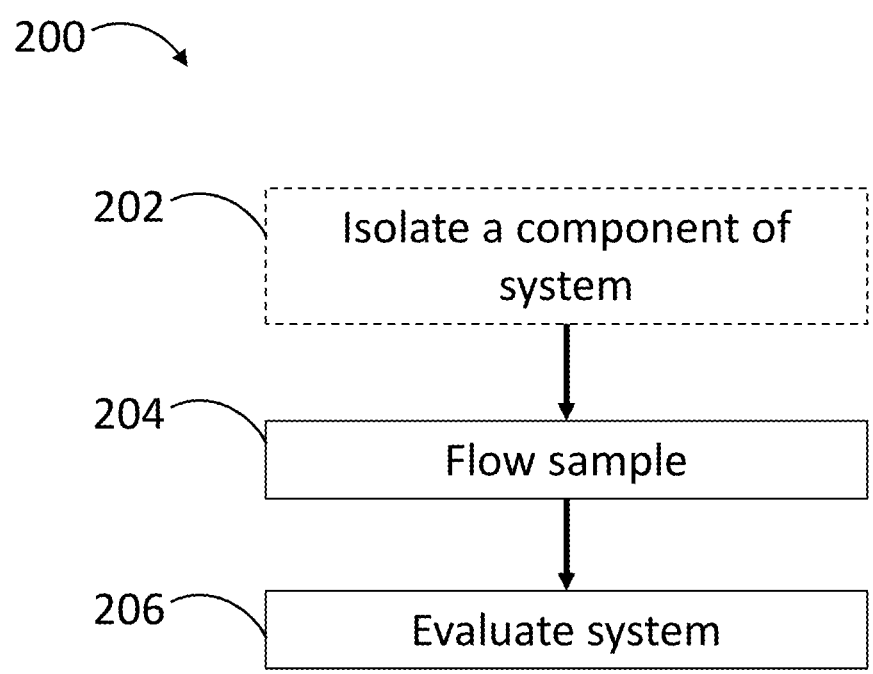
FIG. 2A is a flow chart showing a method of evaluating system suitability, in accordance with an illustrative embodiment of the present disclosure.

In general, the present disclosure relates to systems for the evaluation of system inertness. More specifically, this technology relates to systems for evaluating whether a system, such as an inert liquid chromatography system, is functioning properly and inert.

Testing for system inertness can include testing the health of the system, including as a maintenance step. Specific times for testing the LC system may be scheduled, e.g., after a set amount of time, a set number of uses, or after a specific compound is used. Only a portion of the LC system may need to be tested at a given time. For example, evaluating only a portion of the system may be useful for troubleshooting the system.

What is being tested may also be varied. Evaluation tests which measure multiple performance characteristics at once are desirable. This is achieved by employing various chromatographic approaches using a cocktail of chemical compounds. For example, a single experiment may combine chromatographic approaches to simultaneously evaluate gradient delivery and exposed metal surfaces.

Figures of merit of a LC separation are dependent on a number of difficult to control variables, where "secondary interactions" are a common source of reduced performance. One example is poorly controlled metal content found in stationary phase silica particles. The uncontrolled presence of the metals in the particles results in variable secondary interactions, which can reduce the quality and reproducibility of analytical separations. Additional sources of secondary interactions include various metallic components in chromatographic columns and LC flow path components (e.g., column tube, frits, injector needle, and tubing). In order to attenuate the undesired interactions involving the surfaces of the system (e.g., the surfaces of LC flow path components), analysts have relied heavily on passivating or conditioning hardware surfaces and even making alterations to analytical methods through the use of ion pairing agents, chemical derivatization, and chelators as mobile phase additives, among others.

Another approach presented for addressing the deleterious effects of secondary interactions involves the use of LC components, which prevent contact of the analytes with metal surfaces. These technologies include polyether ether ketone (PEEK) or other non-metal components, PEEK-lined steel components and metal components, which have been chemically modified or coated at the surface. An example of a coated surface is one using surface technology based on vapor deposited organosilica and carboxysilane compositions. A patent application published by Lauber et al. (US 20190086371A) describes this emerging technology in greater detail and is hereby incorporated by reference in its entirety. LC systems based on such technologies are generally described as inert LCs.

There are a number of approaches which can be employed individually or in combination to address the presence of secondary interactions and their impact on the quality of a given chromatographic separation. There exists a need for a system to evaluate whether the system is inert. Consequently, inert LC system characterization approaches are necessary for evaluating proper function of the inert surfaces, particularly when analyzing compounds known to exhibit a high degree of metal interactions. Techniques for system suitability testing of inert LC systems (e.g., chromatographic system/device) are herein described. The system/device and coating to render the system/device inert will be first discussed in relation to FIG. 1.

FIG. 1 is a representative schematic of a chromatographic system/device 100 that can be used to separate analytes, such as peptide compounds, in a sample. System 100 includes several components including a fluid manager system 105 (e.g., controls mobile phase flow through the system), tubing 110 (which could also be replaced or used together with micro fabricated fluid conduits), fluid connectors 115, frits 120, a chromatography column 125, a sample injector 135 including a needle (not shown) to insert or inject the sample into the mobile phase, a vial, or sample container 130 for holding the sample prior to injection, and a detector 150, such as a mass spectrometer. The chromatography column 125 can be a reversed phase column. Interior surfaces of the components of the chromatographic system/device 100 form a fluidic flow path that has wetted surfaces. Components of the fluidic flow path can have a length to diameter ratio of at least 20, at least 25, at least 30, at least 35 or at least 40. The fluidic flow path can include wetted surfaces of an electrospray needle (not shown).

Sample reservoir 130 can contain a sample with a positive control. In some examples, the sample with the positive control further includes a negative control. The ratio of the positive control and negative control can be varied according to the system (e.g., system 100) and/or the testing that will be done to evaluate whether the system is functioning properly and inert. For example, the ratio of positive control to negative control can be a 1:1 molar ratio. In some examples, the positive or the negative control can vary (e.g., 1:2, 1:3, 1:4, 1:5, 2:1, 3:1, 4:1, 5:1). The system can be evaluated on the change of the molar ratio of the sample after flowing through the sample.

At least a portion of the wetted surfaces can have a coating such as an alkylsilyl coating. The coating can tailor the hydrophobicity of the wetted surfaces. The coating can be applied by vapor deposition. As such, methods and devices of the present disclosure can include high pressure resistant materials (e.g., stainless steel) of a flow system, and the wetted surfaces of the fluidic flow path providing the appropriate hydrophobicity so deleterious interactions or undesirable chemical effects on the sample can be minimized.

In some examples, the coating of the flow path is non-binding with respect to the analyte, such as a metal-sensitive compound (e.g., a peptide). Consequently, the analyte, such as peptide compounds, does not bind to the coating of the flow path.

The coating can be provided throughout the system from the tubing or fluid conduits 110 extending from the fluid manager system 105 all the way through to the detector 150. The coatings can also be applied to portions of the components of the fluidic path. That is, one may choose to coat one or more components or portions of a component and not the entire fluidic path. For example, the internal portions of the column 125 and its frits 120 and fluid connectors 115 can be coated whereas the remainder of the flow path can be left unmodified. Further, removable/replaceable components can be coated. For example, the vial 130 containing the sample can be coated as well as frits 120.

In some examples, system 100 will need to be cleared/cleaned before evaluation begins in order to establish a baseline before beginning tests to determine suitability. Ensuring system 100 is at a baseline can help certify that there are no contaminants. It can also be used to validate a preparation process for system 100 after manufacturing of system 100 is complete. For example, after system 100 is manufactured, method 200 of FIG. 2A can be used.

The flow path of the fluidic systems can be defined at least in part by an interior surface of tubing. The flow path of the fluidic systems can also be described as defined at least in part by an interior surface of microfabricated fluid conduits. And the flow path of the fluidic systems can be described at least in part by an interior surface of a column or at least in part by passageways through the system (e.g., passageways through a frit). The flow path of the fluidic systems is also described at least in part by an interior surface of a sample injection needle or extending from the interior surface of a sample injection needle throughout the interior surface of a column. In addition, the flow path can be described as extending from a sample container (e.g., a vial) disposed upstream of and in fluidic communication with the interior surface of a sample injection needle throughout the fluidic system to a connector/port to a detector.

In some examples of a coated or inert fluidic system, only the wetted surfaces of a chromatographic column and the components located upstream of the chromatographic column are coated, e.g., with an alkylsilyl coating, while wetted surfaces located downstream of the column are not coated. The coating can be applied to the wetted surfaces via vapor deposition. Similarly, the "wetted surfaces" of labware or other fluid processing devices may benefit from alkylsilyl coatings. The "wetted surfaces" of these devices not only include the fluidic flow path, but also elements that reside within the fluidic flow path. For example, frits and/or membranes within a solid phase extraction device come in contact with fluidic samples. As a result, not only the internal walls within a solid phase extraction device, but also any frits/membranes are included within the scope of "wetted surfaces." The term "wetted surfaces" refers to all surfaces within a device (e.g., chromatography column, chromatography injection system, chromatography fluid handling system, labware, solid phase extraction device, pipette tips, centrifuge tubes, beakers, dialysis chambers, etc.) that come into contact with a fluid, especially a fluid containing an analyte of interest.

In embodiments which feature an inert coating along or on wetted surfaces, at least a portion of the wetted surfaces are coated with an alkylsilyl coating. The alkylsilyl coating is inert to at least one of the analytes in the sample.

In some embodiments, the alkylsilyl coating is an organosilica coating. In certain embodiments, the alkylsilyl coating is a hybrid inorganic/organic material that forms the wetted surface or that coats the wetted surfaces.

The coating, e.g., the alkylsilyl coating, can have a contact angle with water of at least about 15°. In some embodiments, the coating can have a contact angle of less than or equal to 30°. The contact angle can be less than or equal to about 115°. In some embodiments, the contact angle of the coating is between about 15° to about 90°, in some embodiments about 15° to about 105°, and in some embodiments about 15° to about 115°. For example, the contact angle of the coating can be about 0°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, or 115°.

The thickness of the coating, e.g., the alkylsilyl coating, can be at least about 100 Å. For example, the thickness can be between about 100 Å to about 1600 Å. The thickness of the coating can be about 100 Å, 200 Å, 300 Å, 400 Å, 500 Å, 600 Å, 700 Å, 800 Å, 900 Å, 1000 Å, 1100 Å, 1200 Å, 1300 Å, 1400 Å, 1500 Å or 1600 Å. The thickness of the coating (e.g., a vapor deposited alkylsilyl coating) can be detected optically by the naked eye. For example, more opaqueness and coloration is indicative of a thicker coating. From thin to thick, the color changes from yellow, to violet, to blue, to slightly greenish and then back to yellow when coated parts are observed under full-spectrum light, such as sunlight. For example, when the alkylsilyl coating is 300 Å thick, the coating can appear yellow and reflect light with a peak wavelength between 560 and 590 nm. When the alkylsilyl coating is 600 Å thick, the coating can appear violet and reflect light with a peak wavelength between 400 and 450 nm. When the alkylsilyl coating is 1000 Å thick, the coating can appear blue and reflect light with a peak wavelength between 450 and 490 nm. See, e.g., Faucheu et al., *Relating Gloss Loss to Topographical Features of a PVDF Coating*, Published Oct. 6, 2004; Bohlin, Erik, *Surface and Porous Structure of Pigment Coatings, Interactions with flexographic ink and effects of print quality*, Dissertation, Karlstad University Studies, 2013:49.

The coating can be the product of vapor deposited bis(trichlorosilyl)ethane, bis(trimethoxysilyl)ethane, bis(trichlorosilyl)octane, bis(trimethoxysilyl)octane, bis(trimethoxysilyl)hexane, or bis(trichlorosilyl)hexane. The coating comprises siloxane moieties imparted by the vapor deposited reagents.

In some aspects, at least a portion of the wetted surfaces are coated with multiple layers of the same or different alkylsilane, where the thickness of the alkylsilyl coatings correlate with the number of layering steps performed (e.g., the number of deposited layers of alkylsilyl coating on wetted surfaces).

The chromatographic device can have multiple alkylsilyl coatings. For example, a second alkylsilyl coating can be in direct contact with a first alkylsilyl coating.

In one aspect, the coating is n-decyltrichlorosilane, (3-glycidyloxypropyl)trimethoxysilane (GPTMS), (3-glycidyloxypropyl)trimethoxysilane (GPTMS) followed by hydrolysis, 2-(3,4-epoxycyclohexyl)ethyltrimethoxysilane, trimethylchlorosilane, trimethyldimethyaminosilane, methoxy-polyethyleneoxy(3)silane propyltrichlorosilane, propyltrimethoxysilane, (heptadecafluoro-1,1,2,2-tetrahydrodecyl)tris(dimethylamino)silane, (heptadecafluoro-1,1,2,2-tetrahydrodecyl)trischlorosilane, (heptadecafluoro-1,1,2,2-tetrahydrodecyl)trimethoxysilane vinyltrichlorosilane, vinyltrimethoxysilane, allyltrichlorosilane, 2-[methoxy(polyethyleneoxy)3propyl]trichlorosilane, 2-[methoxy(polyethyleneoxy)3propyl]trimethoxysilane, or 2-[methoxy(polyethyleneoxy)3propyl]tris(dimethylamino)silane.

The flow path components can be made of titanium, alloys such as MP35N® (available from Best Stainless & Alloys, Houston, TX), stainless steel, or other metals. The flow path components include but are not limited to tubing, microfabricated fluid conduits, column frits, column inlet tubing, and sample injection needles. The flow path components can be coated via vapor deposition with one or more of the disclosed alkylsilanes. In some examples, the coated components are annealed to alter their chemical or physical properties.

For flow path components made of other materials than stainless steel or other metals, the flow path components can be coated via vapor deposition with one or more of the disclosed coatings. In particular, sample vials connectable to the injection needle may be coated.

Wetted surfaces of labware or at least some portion of wetted surfaces of labware can be coated via vapor deposition with one or more of the disclosed alkylsilyl coatings. In some examples, vapor deposited coatings can minimize adsorptive losses of the sample. The vapor deposited coating can be both neutral (low in ionic properties) and hydrophilic (exhibiting a contact angle with water less than 60°). The coating can be used to mitigate issues with many different types of materials, including glass and polymeric compositions, such as polypropylene or polyethylene.

Alternatively, commercially available vapor deposition coatings can be used in the disclosed systems, devices, and methods, including but not limited to Dursan® and Dursox® (both commercially available from SilcoTek Corporation, Bellefonte, PA). The process for making is described in U.S. application Ser. No. 14/680,669, filed on Apr. 7, 2015, and entitled "Thermal Chemical Vapor Deposition Coated Article and Process," which claims priority to and benefit of U.S. Provisional Application No. 61/976,789 filed Apr. 8, 2014. The contents of each application are incorporated herein by reference in their entirety.

In one aspect, the alkylsilyl coatings enhance the corrosion performance of metals, e.g., as in metallic chromatography columns. Depending on the density and thickness, the coatings act as a barrier, thereby preventing water and corrosive molecules from reacting with the base metal. Increasing the hydrophobicity and density improves the corrosion performance.

In some embodiments, the alkylsilyl coating is modified with a silanizing reagent to obtain desired surface properties. The silanizing reagent can be a non-volatile zwitterion. The non-volatile zwitterion can be sulfobetaine or carboxybetaine. In some embodiments, the silanizing reagent is an acidic or basic silane. The silanizing reagent can introduce polyethylene oxide moieties.

Other components of the LC system can also include the coatings described herein, for example, the tubing, frits, and/or connectors. LC systems that include multiple/different (e.g., tubing and frits), coated components to minimize or eliminate the presence of metals along wetted surfaces within the fluidic flow path can be used for separating metal sensitive analytes, for example, biomolecules, proteins, glycans, peptides, oligonucleotides, pesticides, bisphosphonic acids, anionic metabolites, and zwitterions like amino acids and neurotransmitters.

Embodiments may be directed to labware instead of chromatographic components. For example, one can use the methods described herein to test the suitability of one or more of a beaker, extraction device, pipette tip, dialysis chamber, autosampler vial or plates that have been coated with an alkylsilyl coating.

The coating provides one method of how to render a system, such as an LC system, suitable for use. Another possible alternative to coating may be to passivate the system using liquid solvents, such as, for example, nitric acid. A system might also be rendered inert from the use of non-metallic surfaces, including polyether ether ketone, or diamond like carbon. A coating can also be a surface or composition deposited by charge vapor deposition or atomic layer deposition. After rendering the system inert, the system then needs to be tested to determine whether the system is suitable or not. Techniques for system suitability testing of systems, such as inert LC systems, are described herein.

FIG. 2A is a flow chart showing a method 200 of evaluating system suitability, in accordance with an illustrative embodiment of the present disclosure. The method has certain steps, which are optional as indicated by the dashed outline surrounding a particular step. Method 200 can start with isolating a component of the system 202. It may be desired to only test a portion of the LC system at a given time. Only a portion of the LC system may need to be tested at a given time. When a component of the LC system (e.g., sample injector or other non-column components) is replaced, the component may be evaluated. Evaluating only a portion of the system (e.g., only a component of the system) may be useful for troubleshooting the system. For example, an analyst know the system is providing inaccurate results but may not the cause of the inaccurate results. By testing individual components, the analyst can determine what component is not inert and negatively affecting the results of the system. Components that can be isolated and tested include labware or other fluid processing devices. Embodiments may be directed to labware instead of chromatographic components, such as a beaker, extraction device, pipette tip, dialysis chamber, autosampler vial or plates that have been coated with an alkylsilyl coating.

As indicated, isolating a component of the system 202 is optional. In some examples, the whole system/device will need to be evaluated for suitability. A suitability sample can be flowed 204 through a system, e.g., system/device 100. The suitability sample can contain one compound or several compounds. The sample contains a positive control as described herein. After the sample flows through the system, a chromatography detector can be used to evaluate the suitability sample and consequently whether the components of the flow path are inert.

During or after flowing suitability sample 204, method 200 includes evaluating the system 206. There are a number of approaches which can be employed individually or in combination to address the presence of secondary interactions and their impact on the quality of a given separation. Inert system characterization approaches are necessary for evaluating proper function of the inert surfaces.

Figure 2B:
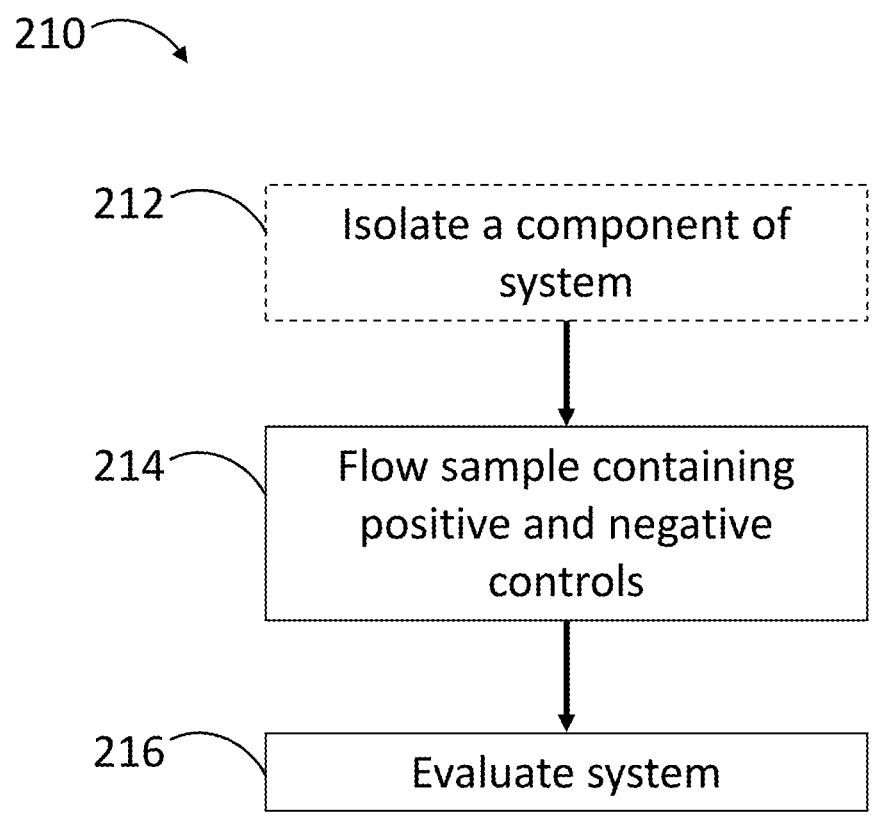
FIG. 2B is a flow chart showing a method of evaluating system suitability, in accordance with another illustrative embodiment of the present disclosure.

FIG. 2B is a flow chart showing a method 210 of evaluating system suitability, in accordance with an illustrative embodiment of the present disclosure. Similar to method 200, method 210 can include optional steps, which are optional as indicated by the dashed outline surrounding a particular step. Method 210 includes an optional first step of isolating a component of the system 212. In contrast to method 200, the sample of method 210 includes a positive control and a negative control. Method 210 includes flowing the sample containing the positive and negative controls through a system (e.g., system 100) 214. In some embodiments, the system suitability analysis is performed simultaneously with an injection of both a sensitive probe that interacts with the surface (positive control) and a non-interacting (negative control) probe. In some embodiments, the system suitability analysis is performed with repeated injections of a sensitive probe that interacts with the surface (positive control) and followed by repeated injections of a non-interacting (negative control) probe. In some embodiments, the non-interacting probe (negative control) is repeatedly injected first, followed by repeat injections of the interacting probe (positive control).

Method 210 includes evaluating the system 216. In some examples, evaluating the system includes comparing peak area ratios of the positive and negative control to confirm system suitability. If the ratio of the positive control to the negative control is sufficiently high, the system is deemed to have good system health and to be suitable for performing analyses. In some examples, sufficiently high is greater than 0.5, 0.6, 0.7, 0.8 0.9 or less than 1.1, where a ratio of 1.0 indicates no loss of analyte to system flow path interactions. What is considered to be sufficiently high can vary based on the negative and positive controls that are selected. For example, positive controls that interact strongly with exposed metal (e.g., ATP or AMPcP) can have a lower end of the range of the ratio be 0.75 or 0.8.

In some examples, an analyst may adjust the system in order to target a ratio of 1.0, and an analyst can determine the lower range of acceptable values for the ratio based on the needs of the analyst/system. Determining system suitability by comparing the amount of detected positive control to negative control includes determining the inertness of the system to the positive control and/or indicates integrity of an inert coating deposited along a flow path of the system.

One of the techniques for assessing the suitability of inert LC systems coupled to optical or MS detectors involves the chromatographic separation and detection of an equimolar solution of Adenosine-5'-Triphosphate (ATP) and Adenosine. These two compounds share a chromophore and consequently share a wavelength of maximum UV absorbance, 259 nm, as well as exhibit identical extinction coefficients at said wavelength, E=15400 at pH 7.0. The difference between the two compounds is a series of three phosphate groups, known to interact with metals. Because ATP contains a metal interacting moiety and adenosine does not, adenosine acts as a structurally similar negative control compound. Furthermore, the substantial difference in the hydrophobicity of the positive and negative control compounds, such as ATP and Adenosine (Log P −5.5 versus −1.05), ensures their resolution in reversed phase chromatographic separations. Two compounds having Log P values differing by greater than one are desirable. Adenosine 5'-(α, β-methylene)diphosphate (AMPcP) is another pairing for adenosine (Log P −4.8 versus −1.05, respectively).

Figure 2C:
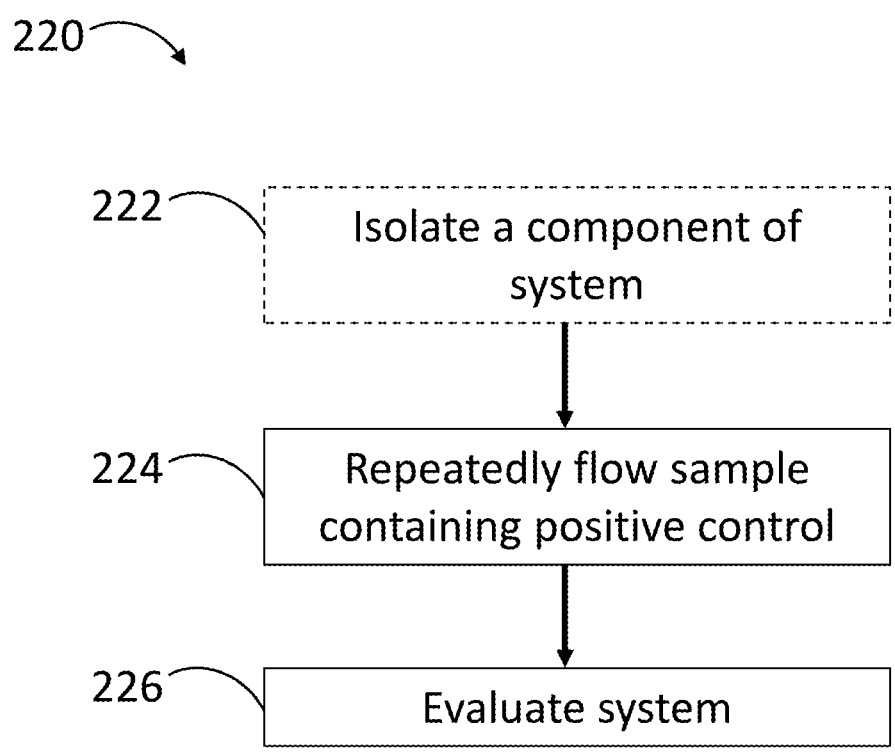
FIG. 2C is a flow chart showing a method of evaluating system suitability, in accordance with yet another illustrative embodiment of the present disclosure.

FIG. 2C is a flow chart showing a method 220 of evaluating system suitability, in accordance with an illustrative embodiment of the present disclosure. Similar to method 200 and method 210, method 220 can include optional steps, which are optional as indicated by the dashed outline surrounding a particular step. Method 220 includes an optional first step of isolating a component of the system 222. The sample of method 220 includes a positive control. In contrast to method 210, method 220 does not contain a negative control. Method 220 includes repeatedly flowing a sample containing the positive control through a system (e.g., system 100) 224.

Method 220 includes evaluating the system 226. In some examples, the system does not contain a chromatography column. When testing is done over repeat injections, it is diagnostic to look at consistency across the injections. A system that is functioning well would show consistent results across the injections for the sample detected. And these results should be reproducible. A system with exposed metal would show changes across the injections. And the number of injections used to evaluate system can vary based on the components of the system as well as the compounds of the sample. In some examples, there are at least 3 injections, 3-50 injections, or 4-20 injections.

Comparison of peak area reproducibility, peak shape and peak shape reproducibility allows for characterizing the liquid chromatograph and chromatographic column's surface inertness and suitability for use in applications. The comparison will use one or more compounds known to bind metals to measure surface inertness and suitability. In some examples, the relative areas between ATP and Adenosine can be used to evaluate the extent of metal interaction in the system while accounting for non-secondary interaction variation (e.g. injection volume) at the same time. Furthermore, evaluation of the peak shape of the ATP compound can be used to characterize system suitability.

In some examples, a method of characterizing a system includes introducing a sample with a positive control and a negative control to the system (e.g., a suitability sample). The positive control is a sensitive probe that interacts with the system and the negative control is substantially non-interacting with the system. In some examples, a compound that is substantially non-interacting with the system can be defined as a compound that does not contain a metal interacting moiety or molecules without one or more strongly electronegative moieties, such as acidic residues with pKas lower than 5. The method can further include detecting the positive control and the negative control and determining system suitability by comparing the amount of detected positive control to negative control.

Determining system suitability by comparing the amount of detected positive control to negative control can include determining a ratio of detected positive control to negative control. If the ratio of the positive control to the negative control is sufficiently high, the system is deemed to have good system health and be suitable for performing analyses. In some examples, sufficiently high is greater than 0.5, 0.6, 0.7, 0.8 0.9 or less than 1.1, where a ratio of 1.0 indicates no loss of analyte to system flow path interactions. In some examples, an analyst may adjust the system in order to target a ratio of 1.0, and an analyst can determine the lower range of acceptable values for the ratio based on the needs of the analyst/system. Determining system suitability by comparing the amount of detected positive control to negative control includes determining the inertness of the system to the positive control and/or indicates integrity of an inert coating deposited along a flow path of the system.

Determining system suitability can include testing one component of the system, e.g., a sample injector. The sample could detrimentally affect other components. The sample can have caustic or other damaging components. In order to preserve the other components of the system, only portions of the system may be tested.

Detecting the positive control and the negative control can use a configuration of liquid chromatography-optical, liquid chromatography-mass spectrometry, or liquid chromatography-optical-mass spectrometry, where optical represents an UV/Vis absorbance or a fluorescence detector. The flow of the suitability sample can also be split.

Characterizing the system can be a previously determined maintenance step of the system. For example, the maintenance step can be scheduled after a previously determined number of uses or previously determined amount of time. In other embodiments, characterizing the system can occur before a long or extremely long separation or run (e.g., day or multiple day run) to ensure suitability prior to initiating a long procedure. In certain embodiments, characterizing the system can occur before separation of an expensive or precious sample. In some embodiments, characterizing the system can occur before separation of a highly metal sensitive sample or sample/application prone to known system environment suitability issues.

Frit adsorption tests can be performed using an ultra-high performance liquid chromatography (UPHLC) system, such as an ACQUITY system (available from Waters Corporation, Milford, MA) equipped with tunable UV detection. In some examples, the system is equipped with a PEEK needle, HST-treated sample loop (hybrid surface technology (HST), an inert coated component, available from Waters Corporation, Milford, MA), and a PEEK tube in place of the active pre-heater to eliminate any metal from the sample flow path, except for the frit(s) being evaluated. Some example dimensions of the frits include 0.2 micron grade, 4.6 mm diameter, and 1.5 mm thick. A system can be used to test only the frit, with no column required. The frit adsorption experiments can be performed using 80:20 acetonitrile:water at 0.5 mL/min and an oven temperature of 30° C. Both ATP and AMPcP (each positive control probes) can be used at a concentration of 4.25 µg/mL in water and monitored at 260 nm. The method can include 2.4 microliter injections, for an injected mass of ~10 nanograms.

The average peak area of 5 injections for the first adsorption tests of a metal-sensitive compound can be used to baseline performance in the absence of metal in the flow path. After baselining the system, frits of various materials can be introduced into the flow path, and again the average peak area for 5 injections of a metal-sensitive compound can be collected as the representative result. The difference between the baseline and experimental values can be used to demonstrate the adsorption of the metal-sensitive compounds to the various frit materials. In some examples, 10 ng injection quantities employed in this testing are far below the maximum binding capacity of the test surfaces. Sequential injection cycles can be produce repeatable sample losses up to and beyond a $10^{th}$ injection.

One example includes comparing the metal binding of ATP versus AMPcP, where 5 injections of 10 ng ATP are performed and compared to a subsequent set of 5 AMPcP injections. In-between testing with ATP and AMPcP, 5 injections of 0.3% (v/v) ammonia (aq) can be injected to remove any adsorbed test analyte. Another exemplary usage of this test is for isolating and testing the frit component of the system. Different frit materials can be tested for their suitability. Alternatively, frit materials at different stages of use (beginning of life/use expectancy; after some use/degradation; at expected end of life/use) can be evaluated.

Figure 3:
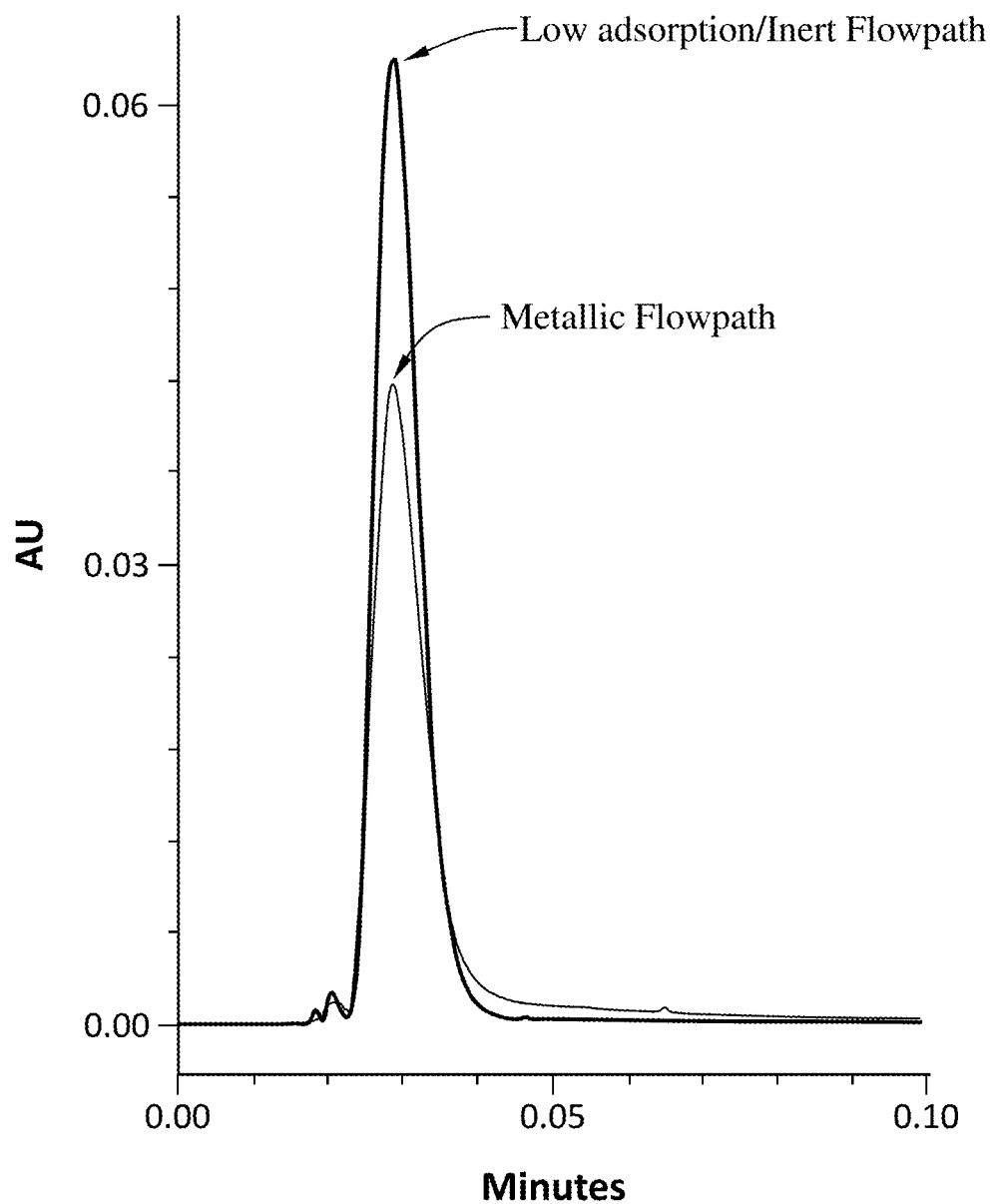
FIG. 3 is a representative example demonstrating an evaluation test for inert surfaces with a metal-sensitive compound and without reliance on chromatography, in accordance with an illustrative embodiment of the present disclosure.

FIG. 3 is a representative example demonstrating an evaluation test for inert surfaces with a metal-sensitive compound and without reliance on chromatography, in accordance with an illustrative embodiment of the present disclosure. Specifically, FIG. 3 displays a representative example demonstrating the ability to measure ATP through a bandspread measurement.

Comparison of peak area, peak shape and any changes in those metrics over repeat injections enables an analyst to characterize the liquid chromatograph's flow path surfaces for attenuation of metal interactions. In some examples, only the positive control probe is used and a set of consecutive injections is performed without a chromatographic column in-line between the autosampler and the detector(s). A system is demonstrated to be suitable for an analysis if there is seen to be minimal change in recovery, peak area, peak height, peak width, and/or peak symmetry across the repeat injections.

In some examples, no chromatography column is used and repeat injections of the suitability sample are flowed through the system and to the detector. If the detector indicates that the compound of the suitability sample is increasing, it may be an indication that the system is not inert. For example, there may be exposed metal, and the sample is slowly passivating the exposed metal so that an increasing amount of suitability sample is detected after each injection.

Example 1 (described below and displayed in FIG. 3) demonstrates the ability to characterize inert LC flow paths with ATP only through the implementation of a bandspread test. An inert, PEEK zero-volume union is used in place of a column. The measured peak area and peak symmetry are then compared to reference values established on LC systems verified to be inert.

Table 1 shows the minimum specifications for the described injection suitability tests (i.e., without a column for the test) utilizing ATP. The minimum specifications are dependent on the instrument platform. For example, different variants of ultra-high-performance liquid chromatography (UHPLC) with different flow path parts (constructed of different materials, different lengths of tubing) as well as platforms with different coupled detectors or configurations (LC-optical, LC-MS, LC-optical-MS with or without split flow, where optical represents an UV/Vis absorbance or a fluorescence detector) can provide different results. The underlying reason relates to the amount of exposed metal introduced into the flow path from sample injection to detection. With increasing exposed metal there is a corresponding change in the resulting measurements of the test probes.

TABLE 1

Minimum specifications for system inertness
Inert System Specifications

| Metric | Injection Test |
|---|---|
| Peak Area Reproducibility | <2.4% RSD |
| Peak Height Reproducibility | <1.8% RSD |
| Peak Shape | Asymmetry at 10% < 1.9 |

As discussed herein, the minimum specifications are dependent on the instrument platform, including the sample components such as positive control (e.g., ATP or AMPcP). In some examples, peak area reproducibility and peak height reproducibility for inert system specifications can have a RSD of less than about 5%, 4%, 3%, 2.5%, 2.4%, 2.3%, 2.2%, 2.1%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, or any intervening number. In some examples, peak shape can have asymmetry at 10% of less than about 5, 4, 3, 2.5, 2.4, 2.3, 2.2, 2.1, 2, 1.9, 1.8, 1.7, 1.6, 1.5, 1.4, 1.3, 1.2, 1.1, 1, 0.9, 0.8, 0.7, 0.6, 0.5, 0.4, 0.3, 0.2, 0.1, or any intervening number.

The above described evaluation approaches are well suited for UV and MS given that Adenosine and ATP are readily measured by UV absorbance and mass spectrometric detection. Generally, a separation or selective form of detection is needed to compare recoveries of both the positive and negative control in a single run. One form of selective detection using optical detection can be made possible by positive and negative control molecules having unique spectral properties. For instance, a positive control molecule can have a unique molar absorptivity and wavelength maximum at 280 nm, while a negative control molecule can have a UV absorbance profile with a 40 nm red shift. A no-column injection can thereby be performed and a tunable UV or PDA detector can be employed to detect absorbance at 280 versus 320 nm. Selective fluorescent detection with molecules have distinct excitation and emission spectral bands represents yet another preferred embodiment for performing a rapid, no-column injection test.

Figure 4:
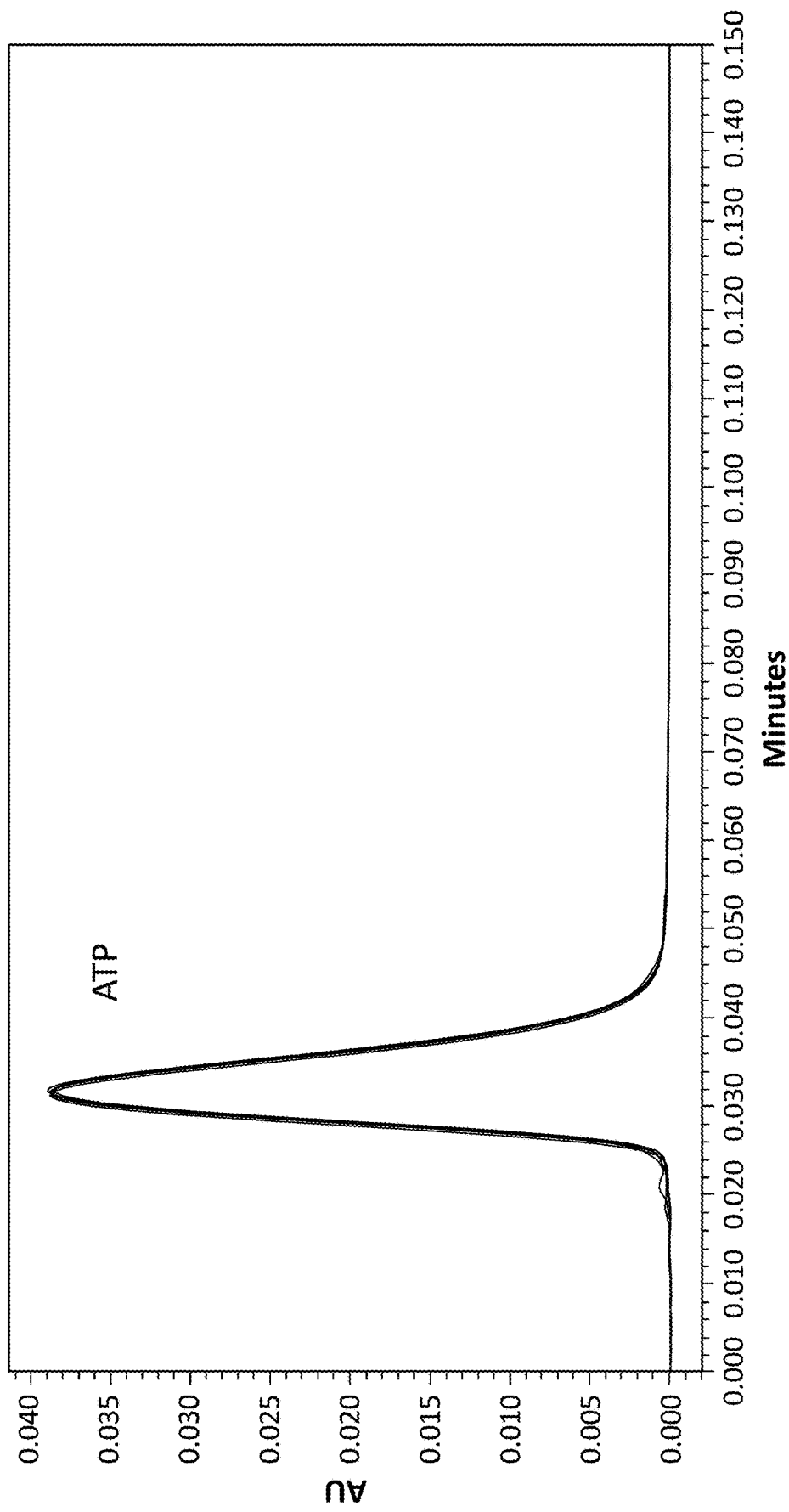
FIG. 4 displays an ATP injection test with a system that has components of the flow path coated. The results of a total of 5 different injections are shown in FIG. 4.
Figure 5:
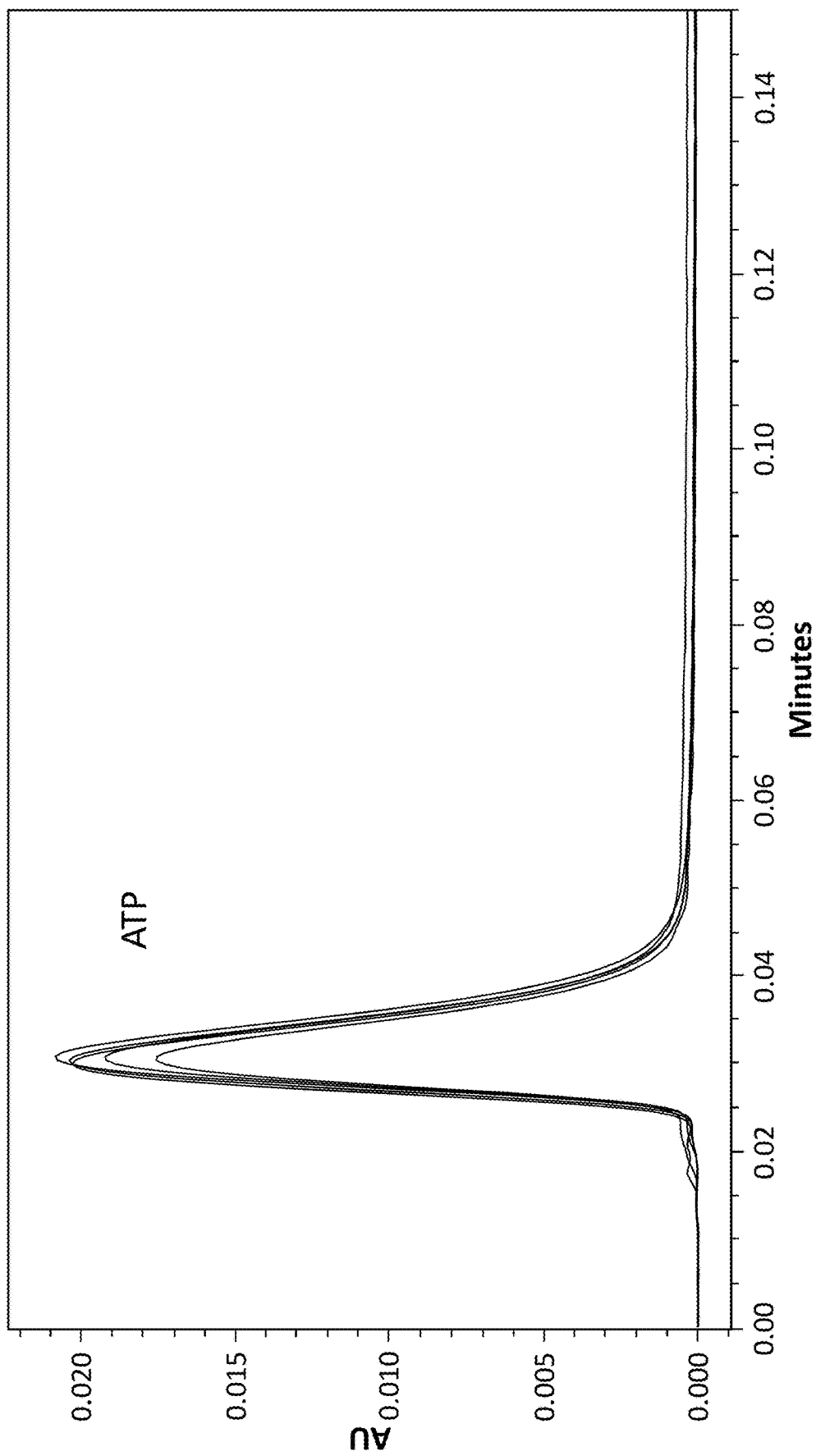
FIG. 5 displays an ATP injection test with a system that has components of the flow path not coated. The results of a total of 5 different injections are shown in FIG. 5.

FIG. 4 and FIG. 5 display injection tests with Adenosine-5'-Triphosphate (ATP). FIG. 4 displays an ATP injection test with a system that has components of the flow path coated. In contrast to FIG. 4, FIG. 5 displays an ATP injection test with a system that has components of the flow path not coated. In the example of FIG. 5, the bio flow path uses MP35N® (available from Best Stainless & Alloys, Houston, TX) that has not been coated. Measurements of FIG. 4 and FIG. 5 include a relative standard deviation (RSD) for area and height as well as reduced asymmetry at 10%. Table 2 tabulates the measurements of FIGS. 4 and 5 that can be used to evaluate system inertness. By comparing the measurements of the coated flow path of FIG. 4 versus the bio flow path of FIG. 5, the system of FIG. 4 is evaluated to be more inert than the system of FIG. 5 due to the reduced RSD as well as asymmetry at 10%.

TABLE 2

ATP Injection Test Measurements

| Metric | ATP Injection Test | |
|---|---|---|
| | Coated Flow Path | Bio Flow Path |
| Area RSD | 0.8 | 8.2 |
| Height RSD | 0.7 | 6.5 |
| Asymmetry at 10% | 1.67 | 2.08 |

While the use of a single positive control probe (e.g., in the above embodiment ATP) can be sued as part of a method to test performance of a system or portion thereof, the use of both a positive control and negative control to test the suitability of a system can be advantageous. For example, in a scenario where only ATP is injected and the response is lower than expected, one would be left speculating at whether the result was due to metal interactions or due to mechanical aspects of the system. To distinguish the impact of metal interactions from other system performance problems, a second control (i.e., negative control probe, one that doesn't interact with metal) was implemented.

Figure 6:
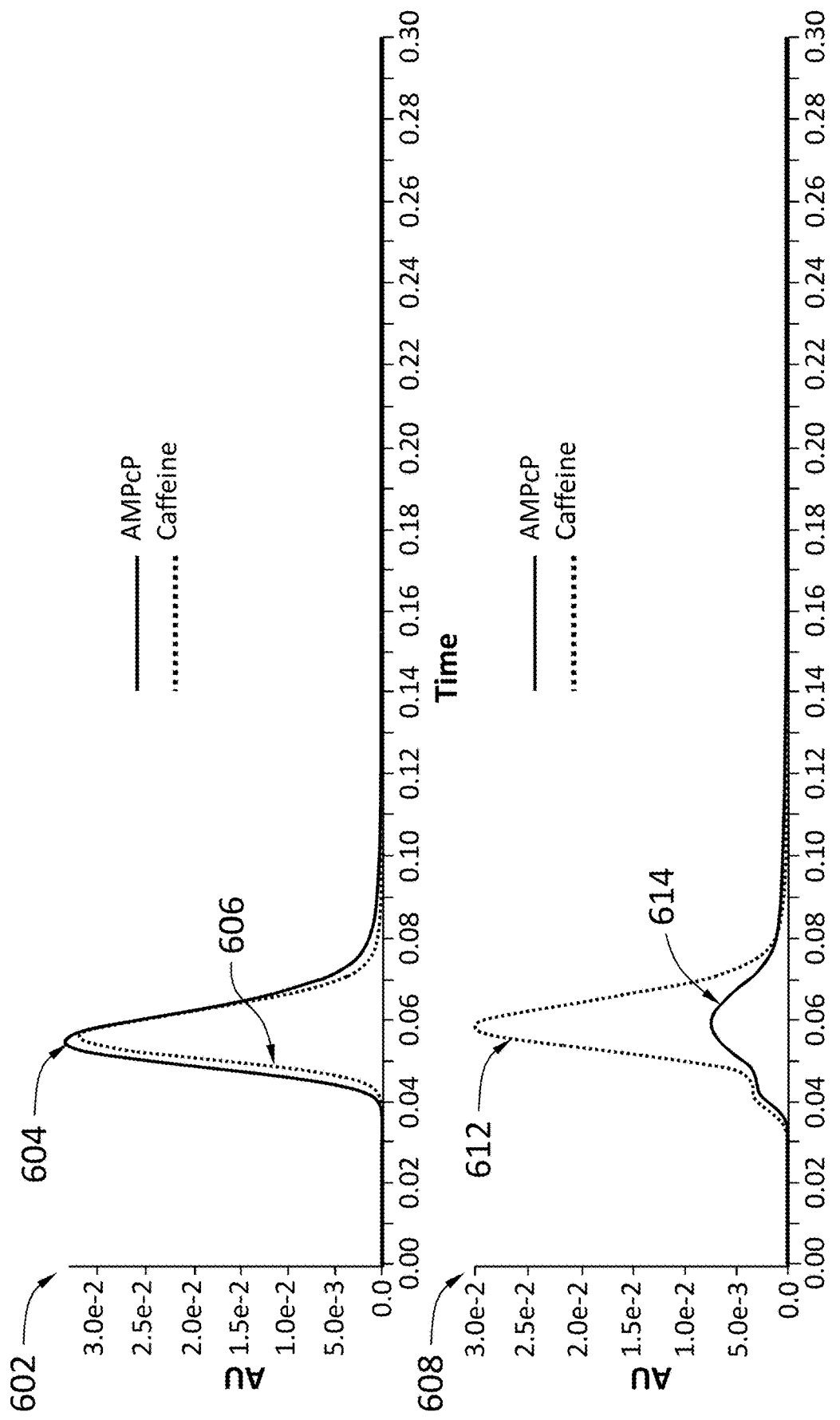
FIG. 6 displays how replicate injections of AMPcP and caffeine with a UHPLC having partially coated/inert surfaces (i.e., graph 608, partially configured with hybrid surface technology (HST)) versus fully coated/inert surfaces (i.e., graph 602 and configured with HST)) readily identified exposed metal surfaces through increased peak area relative standard deviation as well as a reduction in absolute recovery.

FIG. 6 displays an overlay of representative chromatograms of AMPcP (positive control probe) and caffeine (negative control probe) on an ethylene bridged HST LC system (top chromatogram, 602; AMPcP, 604; caffeine, 606) versus the same system where one part was swapped for an MP35N equivalent (bottom chromatogram, 608; AMPcP, 614; caffeine, 612). That is, FIG. 6 shows an overlay of injections of caffeine (606, 612) and AMPcP (604, 614) on an ethylene bridged HST LC system versus a partially inert system where one component (representing approximately ~40% of the flow path surface area) was replaced with an MP35N part (i.e., a part with exposed metal). The system configuration included the use of a zero-volume union in place of a column (i.e., no column). Samples of AMPcP and caffeine were maintained at 10° C. and 1 µl injections were analyzed using an isocratic method at a flow rate of 0.5 µL/min. This method was implemented with a two-minute run time. Flow injection measurements were performed with a specific sequence, starting with six injections of 0.3% (v/v) ammonia (aq), an additional two minutes of equilibrium, three blank injections and then six injections of the AMPcP followed by six injections of caffeine.

FIG. 6 displays how replicate injections of AMPcP and caffeine with a UHPLC partially configured with hybrid surface technology (HST) (versus fully configured) readily identified exposed metal surfaces through increased peak area relative standard deviation as well as a reduction in absolute recovery. Injections of caffeine were explored as part of the system suitability measurement. Caffeine was used as a negative control for metal binding. Caffeine is not predicted to interact with metal surfaces and can therefore give an instrument specific representation of peak shape and dispersion, and overall mechanical system performance.

The experimental protocol, for the results depicted in FIG. 6, included initial injections of 0.3% ammonium hydroxide to clean any metal surfaces, followed by multiple injections of AMPcP, and finally multiple injections of caffeine. The conditions included flow rate of 0.5 mL/min of 80:20 acetonitrile:water. AMPcP and caffeine replicates were analyzed after six replicate injections of 0.3% ammonium hydroxide (aq) and two minutes of equilibration with the stated mobile phase and flow rate.

A comparison of representative caffeine injections run on this fully versus partially inert system (FIG. 6, top chromatogram 602 as compared to bottom chromatogram 608) showed nearly identical peak area, peak height, and peak shape. The average values for peak area, peak height, and area RSD were 16100 µAU*sec, 32000 µAU, and 1.0%, respectively, on the fully inert system and average values for peak area, peak height, and area RSD were 16300 µAU*sec, 32800 µAU, and 1.0%, respectively, on the partially inert system. There is good agreement in values obtained on the two systems which confirms that caffeine does not undergo any significant interactions with metal. Additionally, this information confirms that both LC configurations were equivalently assembled and functioning properly. It is important to be able to distinguish between system inertness and mechanical performance. The addition of caffeine to a testing protocol allows for these observations to be decoupled.

In contrast to the caffeine results (606 and 612), AMPcP injections (604 and 614) proved to be significantly different when observed on the fully versus partially inert system. Average values for AMPcP peak area and peak heights were 18000 µAU*sec and 34400 µAU, respectively, with the fully inert system, whereas the same values were 12900 µAU*sec and 18100 µAU with the partially inert system. This corresponded to a 28% decrease in average peak area and an 47% decrease in average peak height. The AMPcP peak area relative standard deviation on the fully inert system was 0.4%, while the same measurement on the partially inert system increased to 4.3%.

The data presented above demonstrates an effective approach for determining both system inertness and system performance. The data collected above used an inert system where a single part was knowingly changed to a metal part. In some examples, this test can be used to determine the presence of unknown amounts of metal in a flowpath. Observations of repeatability (or lack thereof) are likely to be the most diagnostic of problems from metals. Moreover, a ratio of peak areas between AMPcP and caffeine might prove effective. In FIG. 6, the fully inert system showed a peak area ratio of 1.1 (as predicted), whereas the partially inert system showed a peak area ratio of only 0.79, indicating some of the metal-sensitive AMPcP had been lost to the flow path.

FIGS. 7A, 8A, and 9A provide chromatograms of caffeine versus AMPcP peaks for three different systems. The chromatographic system used to obtain the peaks of FIG. 7A was equipped with PEEK (an inert, non-metal containing system). The chromatographic system used to obtain the peaks of FIG. 8A was equipped with ethylene bridged hybrid coated chromatographic surfaces (a metal system made inert via an organosilica coating deposited on chromatographic surfaces. The chromatographic system used to obtain the peaks of FIG. 9A was equipped with a purposely degraded ethylene bridge hybrid chromatographic surface (a system with expected metal exposure due to the degradation of the coating). The system configuration for each system used in FIG. 7A, FIG. 8A, and FIG. 9A included the use of a zero-volume union in place of a column (i.e., no column). Samples of AMPcP and caffeine (samples of AMPcP and caffeine were prepared at 4.25 µg/mL respectively in 80:20 water:acetonitrile (v:v) were maintained at 10° C. and 1 µl injections were analyzed using an isocratic method at a flow rate of 0.5 µL/min. This method was implemented with a two-minute run time. Flow injection measurements were performed with a specific sequence, starting with six injections of 0.3% (v/v) ammonia (aq), an additional two minutes of equilibrium, three blank injections and then six injections of the AMPcP followed by six injections of caffeine A quick visual comparison of FIGS. 7A, 8A, and 9A illustrate how using an embodiment of the system suitability solution (AMPcP and caffeine containing equimolar solution) is used to show suitability (peak shapes of equimolar positive and negative control probes) to be substantially similar as compared to unsuitable (peak shape of caffeine differing from that of AMPcP).

While the mathematical calculations for repeatability and peak area ratio are useful for determining system inertness, one last type of data treatment was explored, namely a tool to compare the acquired caffeine and AMPcP chromatograms, output a difference plot and also quantify the percent difference between the traces. The peak visualizer tool was designed to take the chromatograms for caffeine and AMPcP (i.e., those shown in FIGS. 7A, 8A, and 9A) and normalize their peak heights before plotting differences in intensity across the collected data points (FIGS. 7B, 8B, and 9B). The peak heights are normalized to account for any potential differences in sample preparation. The peak visualizer tool therefore identifies meaningful differences in peak shape and tailing between the two chromatograms. For a fully inert system, the comparison of the caffeine and AMPcP peaks should give an overall low level of difference since the peak shape would only be based on system dispersion effects. If, however, the system contains some amount of exposed metal in the flowpath, the difference in the caffeine peak shapes (702, 702', and 702") and AMPcP peak shapes (704, 704', and 704") would be predicted to be more significant. Example flow injection tests were processed using the prototype peak visualizer tool for an all PEEK flowpath (FIG. 7B) compared to an inert ethylene bridged coated surfaces (FIG. 8B) and difference values of 19.88 and 20.84% were determined. Both are low level differences (i.e., less than 30%) and both are within the same range of difference (i.e., within 1% from each other). Meanwhile, a % difference value of 55.69% was determined for flow injection results from a chromatographic system including ethylene bridged coated surfaces wherein a single component had been purposely and aggressively degraded by exposure to 96 L of aqueous at pH 10 and 90° C. conditions over 57 days (FIG. 9B). The significant increase in % difference on the LC with the force degraded LC component demonstrates the usefulness of the peak visualization tool for determining the presence of metal within the chromatographic flow path. The ease with which this tool can be implemented makes it appealing to consider for this type of system readiness measurement.

EXAMPLES

For the reagents and standards of the examples, all reagents were acquired from Millipore-Sigma (Burlington, MA). LC-MS grade Acetonitrile was acquired from Honeywell (Muskegon, MI). Deionized water was produced using a Millipore Milli-Q system. The liquid chromatography system, including the chromatography columns, has been treated by the above described vapor deposition of organosilica to attenuate metal interactions. Example 1 employs UV detection.

Example 1

UV with Detection of Adenosine-5'-Triphosphate (ATP) without Chromatography Example 1 (displayed in FIG. 3) is a technique for evaluating surface metal exposure that involves no chromatographic separation and relies on repeated measurement of a single, metal-sensitive compounds.

A test sample comprised of 5 ng/µL ATP in 50:50 water: acetonitrile is prepared from a 1 mg/mL stock solutions of ATP in water. This solution is then diluted into a single sample vial to produce the test sample. Due to the anticipated degradation of ATP to ADP by hydrolysis, it is recommended to use freshly prepared test samples.

The method details are found in Table 3. Following the analysis of at least five injections of the test sample, the results can be evaluated for peak area, reproducibility and peak shape for ATP. Effective metal interaction attenuation is indicated by consistent peak areas and peak shape across injections.

TABLE 3

Separation details for Example 1

| Test Conditions | |
|---|---|
| Column | None - use 0.020"ID V-Detail Zero Volume Union |
| Sample: | 5 ng/µL ATP (Adenosine 5'-triphosphate) disodium salt in 50:50 Water:Acetonitrile |
| ACQUITY ™ PREMIER Solvent Manager (available from Waters Corporation, Milford, MA) | |
| Solvent Line A | 50:50 Water:Acetonitrile |
| Wash Solvent | 50:50 Water:Acetonitrile |
| Purge Solvent | 50:50 Water:Acetonitrile |
| Seal Wash Solvent | 50:50 Water:Acetonitrile |
| Diluent | 50:50 Water:Acetonitrile |
| Flow Rate | 0.5 mL/min |
| ACQUITY ™ TUV/PDA Channel A (available from Waters Corporation, Milford, MA) | |
| Detector Inlet Tubing (CH-A and CM-A) | 0.0025 in. ID |
| Detector Inlet Tubing (CH-30A) | 22.5" HPS MP35N welded tube |
| Wavelength: Bandspreading | 260 nm |
| Filter | None |
| Sampling rate | 40 points per second |

TABLE 3-continued

Separation details for Example 1

ACQUITY ™ PREMIER FTN (available from Waters Corporation, Milford, MA)

| | |
|---|---|
| Column Heater Set Temperature | OFF |
| Pre-Inject | 0 sec |
| Post-Inject | 6 sec |
| Needle Placement (from bottom) | 3 mm |
| | * make sure that the needle's Z-axis position is properly calibrated. |

Example 2

UV with Detection of Adenosine 5'-(α, β-methylene) diphosphate (AMPcP) without Chromatography Example 2 is a technique for evaluating surface metal exposure that involves no chromatographic separation and relies on repeated measurement of a single, metal-sensitive compounds.

A test sample comprised of 4.25 ng/μL AMPcP in 50:50 water:acetonitrile is prepared from a 1 mg/mL stock solutions of AMPcP in water. This solution is then diluted into a single sample vial to produce the test sample.

The method details are found in Table 4. Following the analysis of at least five injections of the test sample, the results can be evaluated for peak area, reproducibility and peak shape for AMPcP. Effective metal interaction attenuation is indicated by consistent peak areas and peak shape across injections.

The above aspects and features of the present disclosure provide numerous advantages over the existing technology. In some embodiments, there are numerous benefits relating to systems for the evaluation of system inertness. For example, the present disclosure characterizes systems by evaluating whether a system, such as an inert liquid chromatography system, is functioning properly and inert. The embodiments and features are combinable.

What is claimed is:

1. A method for evaluating system inertness, the method comprising:
repeatedly injecting a sample into a system, wherein the sample comprises a positive control; the system comprising: fluidic paths wherein interior surfaces of the fluidic paths define wetted surfaces, and wherein at least a portion of the wetted surfaces of the fluidic flow

TABLE 4

Separation details for Example 2

Test Conditions

| | |
|---|---|
| Column | None - use 0.020"ID V-Detail Zero Volume Union |
| Sample: | 4.25 ng/μL AMPcP in 50:50 Water:Acetonitrile |

ACQUITY ™ PREMIER Solvent Manager (available from Waters Corporation, Milford, MA)

| | |
|---|---|
| Solvent Line A | 50:50 Water:Acetonitrile |
| Wash Solvent | 50:50 Water:Acetonitrile |
| Purge Solvent | 50:50 Water:Acetonitrile |
| Seal Wash Solvent | 50:50 Water:Acetonitrile |
| Diluent | 50:50 Water:Acetonitrile |
| Flow Rate | 0.5 mL/min |

ACQUITY ™ TUV/PDA Channel A (available from Waters Corporation, Milford, MA)

| | |
|---|---|
| Detector Inlet Tubing (CH-A and CM-A) | 0.0025 in. ID |
| Detector Inlet Tubing (CH-30A) | 22.5" HPS MP35N welded tube |
| Wavelength: Bandspreading | 260 nm |
| Filter | None |
| Sampling rate | 40 points per second |

ACQUITY ™ PREMIER FTN (available from Waters Corporation, Milford, MA)

| | |
|---|---|
| Column Heater Set Temperature | OFF |
| Pre-Inject | 0 sec |
| Post-Inject | 6 sec |
| Needle Placement (from bottom) | 3 mm |
| | * make sure that the needle's Z-axis position is properly calibrated. | path are coated with an inert coating, and wherein the inert coating is inert to at least one analyte in the sample;
detecting a value associated with the positive control; and
analyzing the values associated with the detected positive control to determine system inertness.

2. The method for evaluating system inertness of claim 1, wherein the positive control comprises a metal-sensitive or metal chelating molecule.

3. The method for evaluating system inertness of claim 1, wherein the sample consists of or essentially consists of the positive control, and
wherein the system is without a chromatographic column.

4. The method for evaluating system inertness of claim 1, wherein the sample further comprises a negative control.

5. The method for evaluating system inertness of claim 4, further comprising detecting a value associated with the negative control and determining system inertness by comparing the amount of detected positive control to negative control.

6. The method for evaluating system inertness of claim 4, wherein the positive control and the negative control are structurally similar.

7. The method for evaluating system inertness of claim 4, the method further comprising detecting the negative control with the detector,
wherein a value associated with the detected positive control is a peak area value,
wherein analyzing the value associated with the detected positive control to determine system inertness comprises comparing the peak area value of the detected positive control with a peak area value of the detected negative control to determine a ratio of the peak area values, and
comparing the determined ratio of the peak area values of the detected positive control and the detected negative control to a reference value.

8. The method for evaluating system inertness of claim 7, wherein repeatedly injecting the sample into the system comprises injecting the sample at least five times into the system.

9. The method for evaluating system inertness of claim 1, wherein repeatedly injecting the sample into the system comprises injecting the sample at least five times into the system.

10. A method for evaluating system inertness, the method comprising:
injecting a sample into a system, wherein the sample comprises a positive control;
the system comprising:
a sample injector having a sample injection needle for injecting the sample;
a sample reservoir container in fluid communication with the sample injector;
a detector downstream of the sample injector; and
fluid conduits connecting the sample injector, sample reservoir container, and detector,
wherein interior surfaces of the fluid conduits, sample injector, sample reservoir container, and detector form a fluidic flow path having wetted surfaces, and
wherein at least a portion of the wetted surfaces of the fluidic flow path are coated with an inert coating, and wherein the inert coating is inert to at least one analyte in the sample;
detecting the positive control with the detector; and
analyzing a value associated with the detected positive control to determine system inertness.

11. The method for evaluating system inertness of claim 10, wherein the positive control comprises a metal-sensitive or metal chelating molecule.

12. The method for evaluating system inertness of claim 10,
wherein the sample consists of or essentially of the positive control, and
wherein the system is without a chromatographic column.

13. The method for evaluating system inertness of claim 10, wherein the sample further comprises a negative control, and wherein injecting the sample comprises injecting the positive control and the negative control.

14. The method for evaluating system inertness of claim 13, wherein the positive control and the negative control are structurally similar.

15. The method for evaluating system inertness of claim 13, wherein the detector comprises at least one of a fluorescence detector, UV/Vis absorbance detector, or mass spectrometer.

16. The method for evaluating system inertness of claim 13, further comprising detecting the negative control and determining system inertness by comparing the amount of detected positive control to negative control.

17. The method for evaluating system inertness of claim 13, the method further comprising detecting the negative control with the detector,
wherein a value associated with the detected positive control is a peak area value,
wherein analyzing the value associated with the detected positive control to determine system inertness comprises comparing the peak area value of the detected positive control with a peak area value of the detected negative control to determine a ratio of the peak area values, and
comparing the determined ratio of the peak area values of the detected positive control and the detected negative control to a reference value.

18. The method for evaluating system inertness of claim 10, wherein injecting the sample comprises injecting a negative control and the positive control into the system, and wherein the system is without a chromatographic column.

19. The method for evaluating system inertness of claim 18, wherein the detector comprises at least one of a fluorescence detector, UV/Vis detector, or mass spectrometer.

20. The method for evaluating system inertness of claim 10, wherein the sample consists of or essentially of the positive control, the method further comprising multiple injections of the sample into the system.

21. The method for evaluating system inertness of claim 10, wherein the inert coating comprises siloxane moieties.

22. The method for evaluating system inertness of claim 10, wherein the inert coating is an alkylsilyl coating.

23. The method for evaluating system inertness of claim 10, wherein injecting the sample into the system comprises repeatedly injecting the sample into the system.

24. The method for evaluating system inertness of claim 10, wherein repeatedly injecting the sample into the system comprises injecting the sample at least five times into the system.

* * * * *